Aug. 25, 1959 L. E. DWORK ET AL 2,901,612

PHASE SHIFT DETECTOR

Filed Dec. 29, 1955

*INVENTORS*
LEO E. DWORK
CHAANG HUANG
*BY* Elmer J. Nealon
ATTORNEY 2,901,612

PHASE SHIFT DETECTOR

Leo E. Dwork, Ipswich, and Chaang Huang, Watertown, Mass., assignors, by mesne assignments, to Sylvania Electric Products Inc., Wilmington, Del., a corporation of Delaware Application December 29, 1955, Serial No. 556,236

2 Claims. (Cl. 250—31)

The present invention relates to circuits for detecting the phase shift between two signals of the same frequency, and for producing output signals that vary in amplitude with the phase shift. More particularly, it relates to such a circuit employing a pair of junction-type transistors of complementary characteristics.

A phase shift detector characteristically responds to the condition wherein, by reason of a relative shift in phase, one input voltage is for a portion of each cycle opposite in polarity to another input voltage. For sinusoidal waveforms A and B of the same frequency, the condition of opposing polarities occurs twice in each cycle, once with the voltage A positive and the voltage B negative, and once the voltage A negative and the voltage B positive. Preferably, the detector responds in identical fashion during each of these intervals. It is accordingly an important object of this invention to provide such a detector.

Hitherto, attempts have been made to provide a phase shift detector by using a single transistor. However, such circuits do not ordinarily possess satisfactory characteristics, in that the output voltage does not vary linearly with the phase shift and the circuit is responsive only during one of the two intervals of opposing polarity in each cycle.

A further object of this invention is to provide a transistor phase shift detector possessing improved characteristics over the transistor detectors hitherto proposed.

A still further object is to provide a transistor phase shift detector suitable for use as a discriminator in a frequency modulation receiver.

With the foregoing and other objects in view, a principal feature of the invention resides in the use of complementary junction transistors in a symmetrical arrangement for phase shift detection.

Another feature resides in the specific application of such a detector as a discriminator in a frequency modulation receiver.

Figure 1:
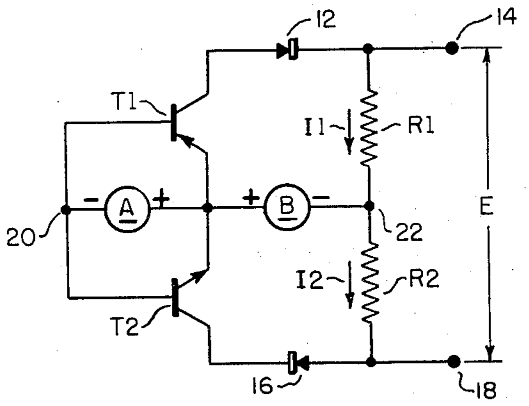
Figure 2:
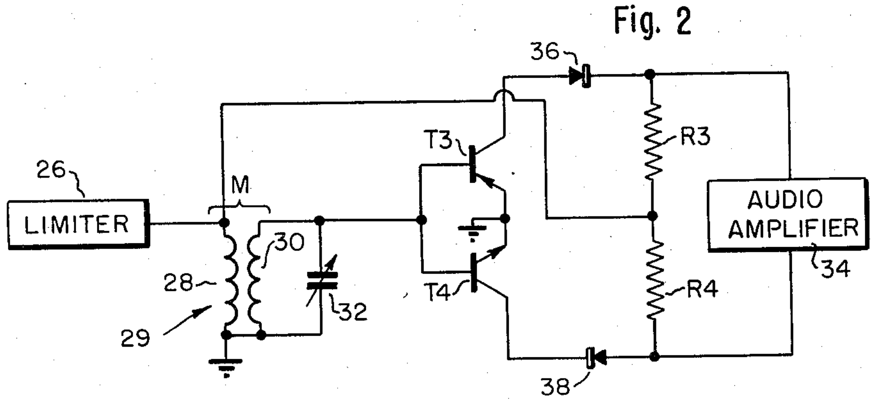
Figure 3:
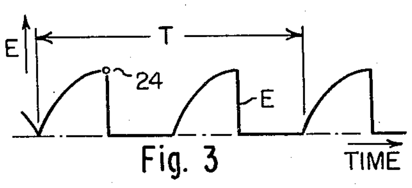
Figure 4:
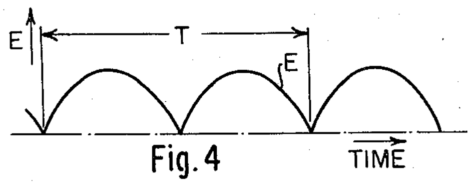
Figure 5:
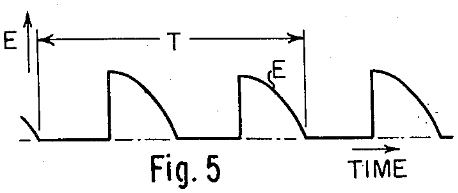

Other features reside in certain structures and circuit arrangements that will become evident from the following description of a preferred embodiment and from the appended drawings, in which Fig. 1 is a schematic circuit diagram illustrating the basic circuit arrangement according to the invention;

Fig. 2 is a schematic circuit diagram illustrating an application of the invention as a discriminator in a frequency modulation receiver; and Figs. 3, 4 and 5 are diagrams illustrating the waveforms of the output voltage of the circuit of Fig. 1, as produced by a pair of input voltages having varying phase relationships.

Referring to Fig. 1, we provide a pair of junction transistors of substantially the same collector current capacity, a transistor T1 of the p-n-p type and a transistor T2 of the n-p-n type, the transistors having mutually connected emitters and bases. The collector of the transistor T1 is connected through a rectifier 12 to a terminal 14, and the collector of the transistor T2 is connected through a rectifier 16 to a terminal 18. The terminals 14 and 18 comprise the output terminals of the circuit. Series connected resistors R1 and R2 are connected between the terminals 14 and 18.

A first input voltage source A is connected between the emitters and bases of the transistors, and a second input source B of the same frequency is connected between the emitters and the point of connection of the resistors R1 and R2.

The operation of the circuit will be readily understood from the diagram. It is apparent that if the polarities of the sources A and B are as indicated in the drawing, the p-n-p transistor T1 conducts, since its emitter is biased positively with respect to its base, and its collector is biased negatively with respect to its emitter. Therefore a current I1 flows through the rectifier 12 and the resistor R1 in the direction indicated by the arrow. However, the collector of the n-p-n transistor T2 does not conduct, since the rectifier 16 is reversely biased and the emitter-to-base and emiter-to-collector voltages are both of improper polarity for conduction in the transistor T2 under these conditions. Consequently, no voltage drop is generated across the resistor R2, and the output voltage E between the terminals 14 and 18 equals the positive voltage generated by the current I1 across the resistor R1 alone.

If the polarities of both of the sources A and B are reversed from those indicated in Fig. 1, the transistor T2 conducts and the transistor T1 does not conduct for the same reasons given above, since the circuit is symmetrical. In that case the current I1 is zero and a current I2 flows through the resistor R2 in the direction indicated by the arrow. The output voltage E is then equal to the positive voltage across the resistor R2 alone. Thus the circuit responds in identical fashion in terms of the output voltage whether the polarities of the sources A and B are as indicated in the drawing or both reversed, provided the signal magnitudes and the response characteristics of the transistors are the same.

It will also be apparent that if the polarity of only one of the sources is changed from that indicated, neither transistor will conduct and the output voltage will be zero.

If the signals generated by the sources A and B are of sinusoidal form with a period T, and if they are out of phase by one-half a period or 180 degrees, the output voltage E is of full-wave rectified sinusoidal form as shown in Fig. 4. If the source polarities are as shown in Fig. 1 during the first illustrated half cycle in Fig. 4, this half cycle results from collector current in the transistor T1, and the second half cycle results from collector current in the transistor T2.

When one source lags the other by a lesser time interval, it is found that the waveform of the output voltage E is composed of portions corresponding to the waveforms of resulting currents that flow during intervals in which the sources are of opposite polarity. When the source A lags the source B by 90 degrees, the waveform of the voltage E is as shown in Fig. 3, having a maximum amplitude as indicated at 24. A phase shift between zero and 90 degrees produces a correspondingly smaller maximum amplitude of the voltage E between zero and the maximum value at 24.

For similar reasons, the waveform in Fig. 5 indicates the voltage E for the case where the source A lags the source B by 270 degrees. As the lag angle increases from this value, bringing the sources A and B toward the in-phase relationship, the maximum amplitude of the output voltage E decreases towards zero, which is the in-phase condition.

It will be appreciated from the foregoing that the rectifiers 12 and 16 are used to prevent spurious reversed currents through the transistors. Thus for example, the rectifier 16 prevents the flow of internal current in the transistor T2 from the emitter to the collector when the source B is of the polarity illustrated in Fig. 1.

Summarizing, it will therefore be seen that the circuit of Fig. 1 produces an output voltage E that varies in maximum amplitude with a phase shift between the sources A and B of 90 degrees or less, the signal also varying in average amplitude from zero for the in-phase condition to a maximum for the 180° out-of-phase condition. The successive lobes in each of the waveforms of Figs. 3 to 5 are due to the alternate conduction of the two transistors T1 and T2. If the phase angle of the sources A and B is varied from 90 degrees, the average value of the output signal is found to increase if the phase angle is increased, and to decrease if the phase angle is decreased. This change in the average value may serve many useful purposes.

For example, if the source A emits pulses and the source B emits sawtooth waveforms, the circuit of Fig. 1 provides a means for measuring their time relationship, and thus may provide control for automatic phase regulation in television synchronization circuits or the like.

Another specific application which is illustrative of the wide variety of uses for the circuit is indicated in Fig. 2. This figure depicts that portion of a frequency modulation receiver that includes the limiter, discriminator, and audio amplifier. The limiter 26, which may be of conventional form, produces a signal of substantially constant amplitude that varies in frequency with the audio signal modulation about a fixed "intermediate" or "center" frequency. The discriminator produces an output signal varying in amplitude with the difference in frequency between the signal produced by the limiter and the center frequency. An additional function of the discriminator is to rectify the signal, thus producing a waveform that may be introduced into the audio amplifier.

The limiter has its output connected to the grounded primary winding 28 of a transformer 29 having a mutual inductance M. The secondary winding 30 is also grounded at one end and is connected at the other end to the bases of junction transistors T3 and T4. The transistor T3 is of the p-n-p type, and the transistor T4 of the n-p-n type. A condenser 32 is connected in parallel with the winding 30 to form a tunable tank circuit that is adjusted to resonate at substantially the center frequency.

The circuit of Fig. 2 is in other respects substantially identical to that of Fig. 1. Resistors R3 and R4 correspond to the resistors R1 and R2. The mutually connected emitters are grounded. The output signal is connected directly to the audio amplifier 34. Rectifiers 36 and 38 correspond to the rectifiers 12 and 16 and serve a similar purpose.

The output signal from the limiter 26 is applied to the midpoint between the resistors R3 and R4, and hence corresponds to the source B in Fig. 1. The voltage across the secondary winding 30 corresponds to the source A in Fig. 1. Thus for the reasons given above with reference to Fig. 1, the circuit is sensitive to the phase relation between the voltages across the primary and secondary windings of the transformer 29. This phase relation is a function of the frequency, since the impedance angle of the tuned circuit influences the phase angle between the primary voltage and the secondary voltage.

Let it be assumed that the frequency emitted by the limiter is momentarily equal to the tuned frequency of the tank circuit. The primary circuit is essentially inductive, whereby the primary current lags the applied voltage by an angle close to 90 degrees and a flux is produced that is substantially in phase with the current. This flux induces a voltage in the secondary winding that is out of phase with it by substantially 90 degrees. Since the tank circuit is assumed to be in resonance, the current circulating in the tank circuit is in phase with this induced voltage the voltage applied to the base-emitter circuits of the transistors is equal to the potential drop across the condenser 32 and lags this latter current by substantially 90 degrees. Thus, the voltage across the condenser lags the primary applied voltage by substantially 90 degrees.

Let it next be assumed that the frequency emitted by the limiter is decreased a specified amount below the tuned frequency of the tank circuit. Under these conditions the tank circuit becomes capacitive and the current therein leads the secondary induced voltage. Since the potential drop across the condenser lags the current through the condenser by 90 degrees, the phase angle between the voltage across the condenser and the primary voltage then assumes a value less than 90 degrees.

Thus the two input voltages to the discriminator are out of phase by 90 degrees at the tuned center frequency, by less than 90 degrees at lower frequencies, and by more than 90 degrees at higher frequencies. For the reasons previously given, the average value of the output waveform decreases from its value at the center frequency as the frequency is decreased therefrom, and increases from the value at the center frequency as the frequency is increased therefrom. Suitable rectifying circuits responsive to the average value of the output waveform (not shown) are provided at the input to the audio amplifier in accordance with conventional practice.

It will be appreciated from the above that we have provided a novel circuit employing junction transistors of complementary types to provide a balanced phase discriminating circuit, which is useful wherever phase discrimination is required, for example in frequency modulation receivers. But it will be understood that while the invention has been described with reference to a specific application, it is by no means limited thereto.

Having thus described the invention, we claim:

1. A frequency modulation discriminator comprising, in combination, a p-n-p transistor and an n-p-n transistor having common emitter and base connections, a pair of series-connected impedances, each impedance being situated in the collector-to-emitter circuit of one of the transistors, each of said circuits including a rectifier, a transformer having a primary winding connected between the emitter and the connection between said impedances and a secondary winding connected between the emitters and bases, and a capacitor connected in parallel with the secondary winding.

2. A frequency modulation discriminator comprising, in combination, a p-n-p transistor and an n-p-n transistor having grounded emitters and a common base connection, a pair of series-connected impedances, each impedance being situated in the collector-to-emitter circuit of one of the transistors, each of said circuits including a rectifier, a transformer having one winding connected between ground and the connection between said impedances and a second winding connected between ground and the bases, and a capacitor connected in parallel with the second winding, said second winding and capacitor forming a tuned circuit resonant at the unmodulated frequency.

References Cited in the file of this patent

UNITED STATES PATENTS

| | | |
|---|---|---|
| 2,666,819 | Raisbeck | Jan. 19, 1954 |
| 2,698,392 | Herman | Dec. 28, 1954 |
| 2,745,038 | Sziklai | May 8, 1956 |
| 2,759,179 | Kircher | Aug. 14, 1956 |
| 2,820,143 | D'Nelly | Jan. 14, 1958 |

OTHER REFERENCES

Sziklai et al.: "A Study of Transistor Circuits for Television," Proceedings of the IRE, June 1953, page 723.